UNITED STATES PATENT OFFICE.

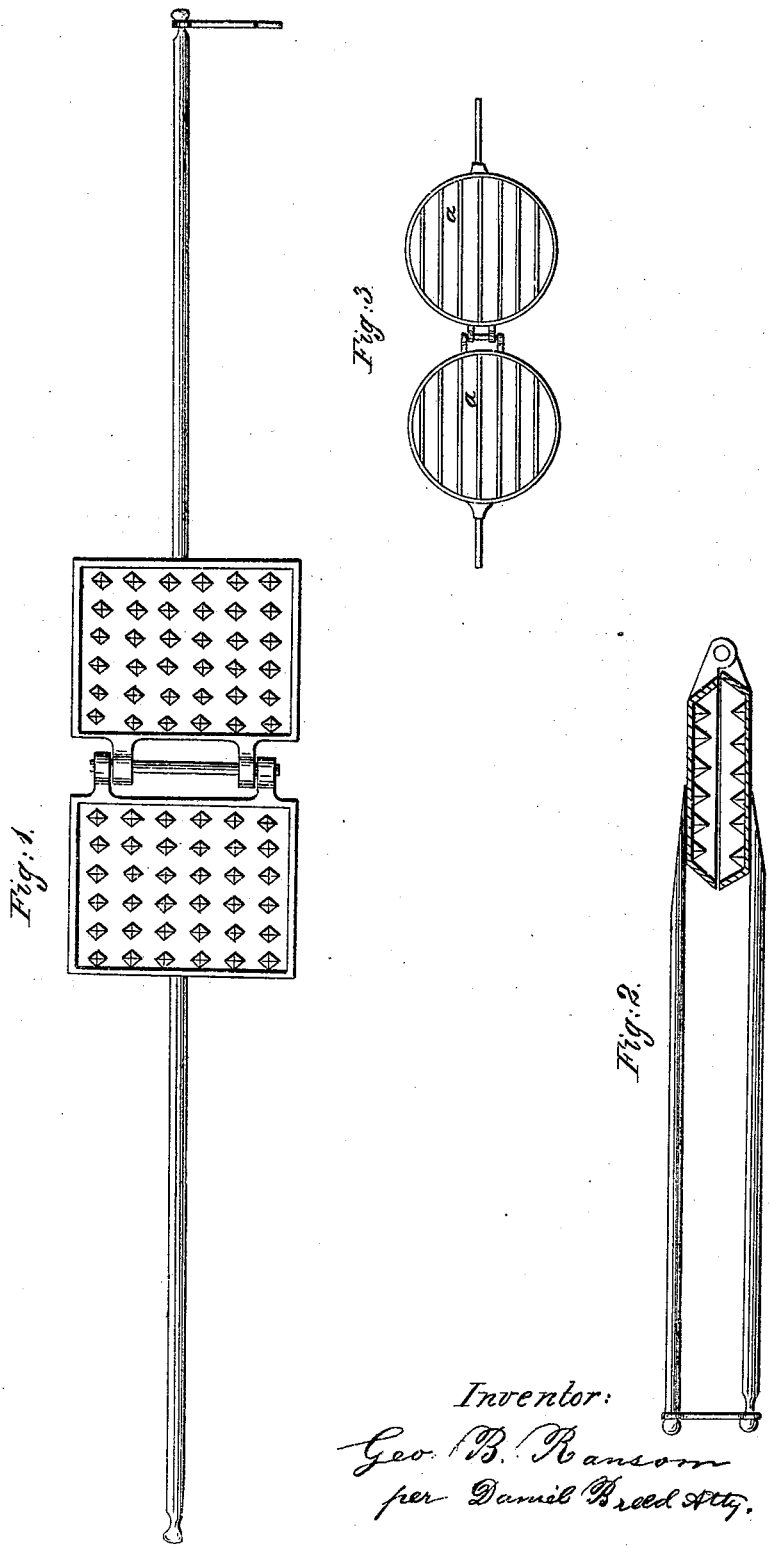

GEORGE B. RANSOM, OF CHESTER, CONNECTICUT.

IMPROVEMENT IN MEAT-BROILERS.

Specification forming part of Letters Patent No. 37,460, dated January 20, 1863.

*To all whom it may concern:*

Be it known that I, GEORGE B. RANSOM, of Chester, in the county of Middlesex and State of Connecticut, have invented a new and useful Improvement in Meat-Broilers; and I do hereby declare that the following is a full and exact description thereof, reference being had to the accompanying drawings, and to the letters of reference marked thereon.

My improvement in meat-broilers consists of two shallow pans fitting together, so that one may serve as a cover to the other, both pans being provided with a series of pyramids to prevent the meat from coming in contact with the bottom of the pans, in order to completely inclose the meat while broiling and to prevent it from frying.

In the accompanying drawings, Figure 1 is a top view of my broiler, the pans being opened. Fig. 2 is a lateral view of the same with a section through the pans. Fig. 3 is a modification of the broiler, Fig. 1, the ribs *a* being cast with the bottom of the pan.

In the construction of my meat-broiler the two pans A may be cast with the metallic pyramids *a* at the bottom of the pans. Then these pans are hinged together by means of the rod C, and the handles D are riveted to the pans. A small link or hook, E, serves to hold the handles together when the pans are shut together inclosing the meat for broiling. The object of the pyramids *a* is to prevent the meat from coming in contact with the bottom of the pans. As a steak rests upon the apexes of these pyramids, very little of the surface of the meat comes against the iron; therefore the meat will broil and not fry or dry up. The meat being completely inclosed while broiling, the juices and odor of the same cannot escape, as they must in all cases of open broilers. The broiler and meat may be turned quickly over while the meat is cooking without allowing the gravy or drippings from the meat to escape from the broiler.

In the use of my broiler the same should be well heated on both sides before the meat is placed in the broiler. Then the meat is laid into one of the pans and the broiler is closed and locked together by the hook E upon the handle. Now, both sides of the broiler must be kept hot, so as to broil both sides of the meat rapidly and at the same time.

By experience I find that a steak broiled in my improved broiler is much better tasted and more tender than when broiled without being inclosed. Ribs or bars might be used to keep the meat from the bottom of the pans A; but I prefer the use of the metallic pyramids *a* cast as a part of the pans, and the size and form of the pans A may be varied without changing the principle of my improvement.

The two great objects of my improvement in broilers are, first, to inclose or closely cover up the meat while cooking, and, second, to broil the same without frying it.

I believe this mode of broiling meat is new and a great improvement over the modes heretofore known.

My broiler differs from the common waffle-iron both in purpose and construction. In a waffle-iron the teeth are blunt and the spaces between them narrow, so that the teeth themselves afford a broad surface of iron to conduct heat into the waffle; but with my broiler the teeth are sharp and the spaces between them broad, so as to afford little surface of iron for contact with the meat. Again, the waffle-iron teeth bite nearly through the waffle in order to make the latter thin and to bake same by contact with these broad teeth as well as the pan. My large broilers will receive sausages or the half of a chicken and broil the same, but a waffle-iron could never be used for such purpose.

Having thus fully described my invention, what I claim, and desire to secure by Letters Patent, is—

A meat-broiler constructed substantially as above described so as to inclose the meat or other article and broil the same without close contact with the bottom or top of the broiler, as set forth.

GEO. B. RANSOM.

Witnesses:
JAMES L. LORD,
SOCRATES DENISON.